US008695087B2

(12) United States Patent
Priel et al.

(10) Patent No.: US 8,695,087 B2
(45) Date of Patent: Apr. 8, 2014

(54) ACCESS CONTROL FOR A MEMORY DEVICE

(75) Inventors: Arik Priel, Givat Shmuel (IL); Yariv Fishman, Tel Aviv (IL); Tzvika Visman, Binyamina (IL); Yaron Alterman, Jerusalem (IL); Mauri Liberman, Ra'anana (IL); Eyal Peri, Nir David (IL)

(73) Assignee: SanDisk IL Ltd., Kfar Saba (IL)

( * ) Notice: Subject to any disclaimer, the term of this patent is extended or adjusted under 35 U.S.C. 154(b) by 1365 days.

(21) Appl. No.: 12/082,083

(22) Filed: Apr. 4, 2008

(65) Prior Publication Data

US 2009/0254762 A1 Oct. 8, 2009

(51) Int. Cl.
*G06F 21/00* (2013.01)

(52) U.S. Cl.
USPC ............ 726/20; 726/2; 726/5; 726/9; 726/26; 726/27; 713/165; 713/172; 713/183; 713/184

(58) Field of Classification Search
None
See application file for complete search history.

(56) References Cited

U.S. PATENT DOCUMENTS

| | | | |
|---|---|---|---|
| 4,742,215 A | 5/1988 | Daughters et al. | |
| 4,816,654 A | 3/1989 | Anderl et al. | |
| 4,864,542 A | 9/1989 | Oshima et al. | |
| 4,882,474 A | 11/1989 | Anderl et al. | |
| 5,282,247 A | 1/1994 | McLean et al. | |
| 5,303,378 A | 4/1994 | Cohen | |
| 5,379,344 A | 1/1995 | Larsson et al. | |
| 5,392,351 A | 2/1995 | Hasebe et al. | |
| 5,418,852 A | 5/1995 | Itami et al. | |
| 5,457,746 A | 10/1995 | Dolphin | |
| 5,537,544 A * | 7/1996 | Morisawa et al. | 726/19 |
| 5,623,637 A * | 4/1997 | Jones et al. | 711/164 |
| 5,692,190 A | 11/1997 | Williams | |
| 5,698,836 A | 12/1997 | Fujioka | |

(Continued)

FOREIGN PATENT DOCUMENTS

| | | |
|---|---|---|
| GB | 2377525 | 1/2003 |
| WO | WO 01/61692 | 8/2001 |

OTHER PUBLICATIONS

Di Pietro, Roberto; Me, Gianluigi; Strangio, Maurizio. A Two-Factor Mobile Authentication Scheme for Secure Financial Transactions. International Conference on Mobile Business, 2005. Pub. Date: 2005. Relevant pp. 28-34. Found on the World Wide Web at: http://ieeexplore.ieee.org/stamp/stamp.jsp?tp=&arnumber=1493584.*

(Continued)

*Primary Examiner* — Cordelia Zecher
*Assistant Examiner* — Jeremiah Avery
(74) *Attorney, Agent, or Firm* — Brinks Gilson & Lione

(57) ABSTRACT

Access control for a memory device is provided. In one embodiment, a portable memory device is provided comprising a storage medium comprising a private area and circuitry operative to (a) receive, from a host device, a password to unlock the host device, (b) compare the password with a password stored in the portable memory device, and (c) if the passwords match, allow the host device to access the private area. In another embodiment, a portable memory device is provided comprising a storage medium comprising a private area and a public area. The public area stores computer-readable program code to facilitate interaction with the access control features of the portable memory device. Methods for use with such memory devices are also provided. Other embodiments are disclosed, and each of the embodiments can be used alone or together in combination.

44 Claims, 10 Drawing Sheets

(56) References Cited

U.S. PATENT DOCUMENTS

| | | |
|---|---|---|
| 5,719,387 A | 2/1998 | Fujioka |
| 5,796,825 A | 8/1998 | McDonnal et al. |
| 5,802,175 A | 9/1998 | Kara |
| 5,809,543 A | 9/1998 | Byers et al. |
| 5,828,053 A | 10/1998 | Kinugasa |
| 5,857,021 A | 1/1999 | Kataoka et al. |
| 5,895,501 A | 4/1999 | Smith |
| 5,963,983 A | 10/1999 | Sakakura |
| 6,035,380 A | 3/2000 | Shelton et al. |
| 6,088,802 A | 7/2000 | Bialick et al. |
| 6,257,486 B1 | 7/2001 | Teicher et al. |
| 6,371,377 B2 | 4/2002 | Asoh et al. |
| 6,374,266 B1 | 4/2002 | Shnelvar |
| 6,377,500 B1 | 4/2002 | Fujimoto et al. |
| 6,415,383 B1 | 7/2002 | Colegrove |
| 6,427,200 B1 | 7/2002 | Wu |
| 6,480,914 B1 | 11/2002 | Hsieh |
| 6,550,011 B1 | 4/2003 | Sims, III |
| 6,560,052 B2 | 5/2003 | Ng et al. |
| 6,577,735 B1 | 6/2003 | Bharat |
| 6,636,963 B1 | 10/2003 | Stein et al. |
| 6,639,843 B2 | 10/2003 | Miyauchi |
| 6,697,944 B1 | 2/2004 | Jones et al. |
| 6,725,322 B1 | 4/2004 | Shiraishi et al. |
| 6,731,731 B1 * | 5/2004 | Ueshima .................. 379/196 |
| 6,738,877 B1 | 5/2004 | Yamakawa et al. |
| 6,757,770 B1 | 6/2004 | Terada et al. |
| 6,763,424 B2 | 7/2004 | Conley |
| 6,763,465 B1 | 7/2004 | Kelly et al. |
| 6,768,942 B1 | 7/2004 | Chojnacki |
| 6,865,431 B1 | 3/2005 | Hirota et al. |
| 6,880,054 B2 | 4/2005 | Cheng et al. |
| 6,931,503 B1 | 8/2005 | Robb et al. |
| 6,950,939 B2 | 9/2005 | Tobin |
| 6,954,862 B2 * | 10/2005 | Serpa .................. 726/5 |
| 6,976,165 B1 | 12/2005 | Carpentier et al. |
| 6,999,947 B2 | 2/2006 | Utsumi et al. |
| 7,036,738 B1 | 5/2006 | Vanzini et al. |
| 7,039,811 B2 | 5/2006 | Ito |
| 7,043,615 B1 | 5/2006 | Kobayashi et al. |
| 7,054,990 B1 | 5/2006 | Tamura et al. |
| 7,055,038 B2 | 5/2006 | Porter et al. |
| 7,065,786 B2 * | 6/2006 | Taguchi .................. 726/18 |
| 7,069,447 B1 | 6/2006 | Corder |
| 7,089,366 B2 * | 8/2006 | Horrigan et al. .......... 711/135 |
| 7,100,053 B1 | 8/2006 | Brown et al. |
| 7,124,301 B1 | 10/2006 | Uchida |
| 7,137,011 B1 | 11/2006 | Harari et al. |
| 7,162,645 B2 | 1/2007 | Iguchi et al. |
| 7,197,638 B1 | 3/2007 | Grawrock et al. |
| 7,227,952 B2 | 6/2007 | Qawami et al. |
| 7,237,046 B2 | 6/2007 | Paley et al. |
| 7,275,161 B2 | 9/2007 | Ochi et al. |
| 7,395,435 B2 * | 7/2008 | Benhammou et al. ........ 713/185 |
| 7,427,024 B1 * | 9/2008 | Gazdzinski et al. .......... 235/384 |
| 7,540,015 B2 * | 5/2009 | Friedman .................. 726/2 |
| 7,552,467 B2 * | 6/2009 | Lindsay .................. 726/5 |
| 7,620,994 B2 * | 11/2009 | Ooshima et al. ............ 726/26 |
| 7,653,184 B2 * | 1/2010 | Serpa .................. 713/184 |
| 7,809,366 B2 * | 10/2010 | Rao et al. .......... 455/419 |
| 7,870,376 B2 * | 1/2011 | Gierens et al. .................. 713/2 |
| 8,140,794 B2 | 3/2012 | Prahlad et al. |
| 8,166,530 B2 * | 4/2012 | Adams et al. ................. 726/9 |
| 8,276,185 B2 * | 9/2012 | Messina et al. ................. 726/2 |
| 8,438,647 B2 * | 5/2013 | Jevans .................. 726/26 |
| 2001/0032088 A1 | 10/2001 | Utsumi et al. |
| 2001/0044901 A1 | 11/2001 | Grawrock |
| 2002/0019935 A1 | 2/2002 | Andrew et al. |
| 2002/0029254 A1 | 3/2002 | Davis et al. |
| 2002/0029343 A1 | 3/2002 | Kurita |
| 2002/0044663 A1 | 4/2002 | King et al. |
| 2002/0080190 A1 | 6/2002 | Hamann et al. |
| 2002/0118095 A1 | 8/2002 | Estes |
| 2002/0145507 A1 | 10/2002 | Foster |
| 2002/0159601 A1 | 10/2002 | Bushmitch et al. |
| 2002/0194479 A1 | 12/2002 | Beuten et al. |
| 2002/0199100 A1 | 12/2002 | Nenashev |
| 2003/0005337 A1 | 1/2003 | Poo et al. |
| 2003/0032486 A1 | 2/2003 | Elliott |
| 2003/0041253 A1 | 2/2003 | Matsui et al. |
| 2003/0043634 A1 | 3/2003 | Miyauchi |
| 2003/0078709 A1 | 4/2003 | Yester et al. |
| 2003/0097340 A1 | 5/2003 | Okamoto et al. |
| 2003/0126451 A1 | 7/2003 | Gorobets |
| 2003/0191716 A1 | 10/2003 | Woods et al. |
| 2003/0229791 A1 | 12/2003 | De Jong |
| 2004/0059925 A1 | 3/2004 | Benhammou et al. |
| 2004/0103288 A1 | 5/2004 | Ziv et al. |
| 2006/0198514 A1 | 9/2006 | Lyseggen et al. |
| 2007/0168292 A1 | 7/2007 | Jogand-Coulomb et al. |
| 2007/0233910 A1 | 10/2007 | Paley et al. |
| 2008/0022413 A1 | 1/2008 | Holtzman et al. |

OTHER PUBLICATIONS

Notice of Allowance for U.S. Appl. No. 12/345,270, dated Nov. 8, 2010, 8 pages.
Notice of Allowance for U.S. Appl. No. 12/345,270, dated Jan. 20, 2011, 9 pages.
"SanDisk Cruzer® Professional," http://www.sandisk.com/OEM/ProductCatalog(1341)-Cruzer_Professional.aspx, 1 page, printed Apr. 3, 2008.
"SanDisk Introduces Two Secure USB Flash Drives for Business: Cruzer Professional and Cruzer Enterprise," http:/www.sandisk.com/Corporate/PressRoom/PressReleases/PressRelease.aspx?ID=3844, 2 pages, Jun. 4, 2007.
Restriction Requirement for U.S. Appl. No. 12/257,989, dated Oct. 30, 2009, 6 pages.
Office Action for U.S. Appl. No. 12/257,989, dated Jul. 6, 2010, 11 pages.
Office Action for U.S. Appl. No. 12/345,270, dated Nov. 27, 2009, 10 pages.
Notice of Allowance for U.S. Appl. No. 12/345,270, dated Jul. 22, 2010, 8 pages.
Notice of Allowance for U.S. Appl. No. 12/345,286, 15 pages, Oct. 18, 2010.
Office Action for U.S. Appl. No. 12/257,989, 14 pages, Dec. 27, 2010.
Notice of Allowance for U.S. Appl. No. 12/345,286, 7 pages, Dec. 15, 2010.
Notice of Allowance for U.S. Appl. No. 12/257,989, dated Jul. 6, 2011, 8 pages.
Office Action for U.S. Appl. No. 12/907,290, dated Sep. 14, 2011, 15 pages.
Notice of Allowance for U.S. Appl. No. 12/257,989, dated Aug. 22, 2011, 7 pages.
Office Action for U.S. Appl. No. 12/907,290, dated Mar. 14, 2012, 10 pages.
Notice of Allowance for U.S. Appl. No. 13/328,859, dated May 3, 2012, 10 pages.
Office Action for U.S. Appl. No. 13/047,448, dated May 2, 2012, 11 pages.
Office Action for U.S. Appl. No. 13/047,448, dated Nov. 5, 2012, 12 pages.
Office Action for U.S. Appl. No. 12/907,290, dated Dec. 3, 2012, 9 pages.
Office Action for U.S. Appl. No. 12/907,290, dated Apr. 11, 2013, 9 pages.
Office Action for U.S. Appl. No. 13/047,448, dated Mar. 13, 2013, 12 pages.
Office Action for U.S. Appl. No. 13/047,448 dated Oct. 9, 2013, 15 pages.

* cited by examiner

Before Portable Memory Device Login

After Portable Memory Device Login

ACCESS CONTROL FOR A MEMORY DEVICE

BACKGROUND

Portable memory devices, such as memory cards, are often used with consumer electronic devices, such as mobile phones and personal computers (PCs) to store and/or transport data. In addition to a storage medium, many portable memory devices contain circuitry, such as a microprocessor, that can transform addresses received from the host device to other addresses, thereby allowing the circuitry on the memory device to control where data is stored in the storage medium.

If a user loses his portable memory device, he faces the risk of others reading the data stored on the device, which may be highly undesirable since the data may be personal or confidential. One way to avoid such data leakage is to encrypt the data using an encryption algorithm such as Data Encryption Standard (DES) or triple-DES. For example, many mobile phone operating systems have a software encryption mechanism for encrypting data to be stored on a memory card inserted into the phone. One drawback to this approach is that the encrypted data can only be accessed from the mobile phone that encrypted the data and not by another host device, such as another mobile phone or a personal computer.

One approach for securing data on a portable storage device uses a storage medium including a secure user area and a microprocessor operable to allow access to the secure user area only when a user provides an appropriate password to the microprocessor.

SUMMARY

The present invention is based, in part, on the foregoing observations and may be implemented in various embodiments, examples of which are provided herein. Moreover, various equivalents of and modifications to the embodiments described and shown herein are possible. Thus, the claimed invention is to be accorded the widest scope consistent with the principles, features, and teachings disclosed herein.

By way of introduction, the embodiments described below provide an access control method for a memory device. In one embodiment, a portable memory device is provided comprising a storage medium comprising a private area and circuitry operative to (a) receive, from a host device in communication with the portable memory device, a password entered by a user to unlock the host device, (b) compare the password received from the host device with a password stored in the portable memory device, and (c) if the password received from the host device matches the password stored in the portable memory device, allow the host device to access the private area. In another embodiment, a portable memory device is provided comprising a storage medium comprising a private area and a public area. The public area stores computer-readable program code that, when executed on a host device in communication with the portable memory device, (a) locks the host device after the portable memory device is placed in communication with the host device, (b) requests a password from a user to unlock the host device, and (c) sends the password to the portable memory device. The portable memory device also comprises circuitry operative to allow the host device to access the private area if the password matches a password stored in the portable memory device. Methods for use with such memory devices are also provided.

Various other embodiments are disclosed. For example, the circuitry in the portable memory device can be operative to perform encryption on data to be stored in the private area and decryption of encrypted data to be read from the private area. Also, while the private area is password protected with a host device unlock password in some of these embodiments, other types of passwords (user-generated or otherwise) can be used. Further, as mentioned above, the portable memory device can have a public area (e.g., accessible without a password) in addition to a private area. In one embodiment, a host device can view either the public area or the private area (but not both) at any given time.

In other embodiments, the public area can store additional forms of computer-readable program code. For example, the public area can store additional computer-readable program code that, when executed on the host device (a) determines if a password has been established to unlock the host device and (b) if a password has not been established to unlock the host device, establishes a password to unlock the host device. As another example, the public area can store additional computer-readable program code that, when executed on the host device (a) determines whether the password stored in the portable memory device was established by the host device or by a different host device, (b) requests a password from the user to unlock the different host device if the password stored in the portable memory device was established by the different host device, and (c) sends the password to unlock the different host device to the portable memory device. Additionally, the portable memory device and the host device can take any suitable form. In one illustrated embodiment, the portable memory device comprises a memory card, and the host device comprises a mobile phone.

Other embodiments are disclosed, and each of the embodiments can be used alone or together in combination. The embodiments will now be described with reference to the attached drawings.

DETAILED DESCRIPTION OF THE PRESENTLY PREFERRED EMBODIMENTS

By way of introduction, the following embodiments relate generally to access control for a memory device. In one embodiment, a private area (which will sometimes be referred to herein as a "private memory area") of a portable memory device is password protected with a password used to unlock a host device. While the user can manually enter the unlock password twice (once to unlock the host device and once to gain access to the private area), in one embodiment, the user is requested for the unlock password once (to unlock the host device,) and the host device automatically sends the unlock password to the portable memory device for verification. This seamless log in process allows a user to enjoy the security benefits offered by the private area without requiring the user to perform numerous log in steps.

Figure 1:
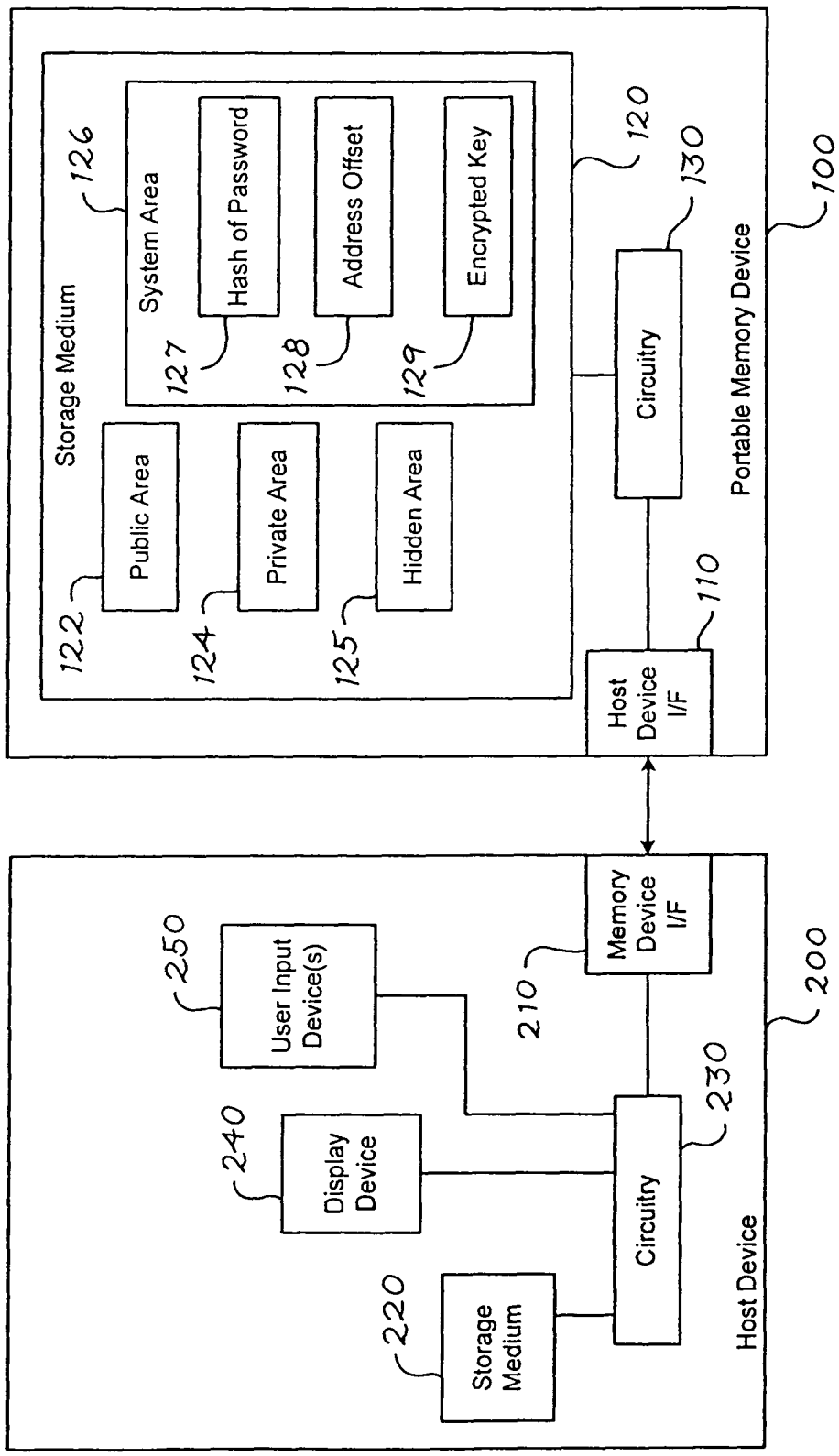
FIG. 1 is an illustration of a host device and a portable memory device of an embodiment.

Turning now to the drawings, FIG. 1 is an illustration of a portable memory device (or "storage device") 100 of an embodiment in communication with a host device 200. As used herein, the phrase "in communication with" means in direct communication with (e.g., through a wired or wireless connection) or in indirect communication with through one or more components, which may or may not be shown or described herein. In this particular illustration, the portable memory device 100 is in communication with the host device 200 via a host device interface 110 and a storage device interface 210, which can be, for example, mating ports.

A "portable memory device" can take any form, such as, but not limited to, a memory card, a Universal Serial Bus (USB) device, and a hard drive. In one presently preferred embodiment, the portable memory device 100 takes the form of a solid-state memory card, such as a MicroSD™ card. Of course, other types of portable memory devices can be used. As shown in FIG. 1, in this embodiment, the portable memory device 100 comprises a storage medium 120, which can comprise any suitable type of memory, such as, but not limited to, solid state, optical, and magnetic memory. While the storage medium 120 is shown as a single component in FIG. 1, it should be understood that several separate storage media can be used. In this embodiment, the storage medium 120 comprises a public area 122, a private area 124, a hidden area 125, and a system area 126, which will be described in more detail below. The storage medium 120 can comprise other or different areas in other embodiments. The portable memory device 100 also comprises circuitry 130 to perform various functions, some of which are described below. As used herein, "circuitry" can include one or more components and be a pure hardware implementation and/or a combined hardware/software (or firmware) implementation. Accordingly, "circuitry" can take the form of one or more of a microprocessor or processor that executes computer-readable program code (e.g., software or firmware stored in the storage medium 120 (such as, for example, the software routines illustrated in the attached flowcharts)), logic gates, switches, an application specific integrated circuit (ASIC), a programmable logic controller, and an embedded microcontroller, for example.

A "host device" refers to any device that can be put in communication with the portable memory device 100 and be used to store data in the portable memory device 100 and/or read data from the portable memory device 100. Examples of host devices include, but are not limited to, consumer electronic devices such as mobile phones, digital media players, digital cameras, game devices, personal computers (e.g., desktop or portable (such as laptop or notebook) computers), email and/or text messaging devices, and personal digital assistants (PDAs). A host device can be a relatively mobile device (such as a mobile phone) or a relatively stationary device (such as a desktop personal computer). As shown in FIG. 1, the host device 200 in this embodiment comprises a storage medium 220, circuitry 230, a display device 240, and one or more user input device 250. The host device 200 can have additional components not shown in FIG. 1. For example, the host device 200 can have components to provide wired or wireless connection to another device (e.g., a wireless transceiver for wireless communication with the Internet).

As mentioned above, in this embodiment, the storage medium 120 of the portable memory device 100 comprises several different areas: a public area 122, a private area 124, a hidden area 125, and a system area 126. In general, the public area 122 is used to store unsecured data, and the private area 124 is used to store secure data. The circuitry 130 of the portable memory device 100 secures the private area 124 using an access control system in which the private area 124 is accessible by a host device (e.g., for read and/or write operations) only upon the receipt of an appropriate password. In contrast, the public area 122 is accessible by a host device without requiring a password. (However, in some embodiments, data is stored in the public area 122 in an encrypted form.) Unlike the public area 122 and the private area 124, the hidden area 125 and the system area 126 are not intended to be directly accessible by ordinary end users. The hidden area 125 can be used, for example, to store a unique ID (such as a serial number) of a host device that stored a password in the portable memory device 100, language and other settings, and operational information. The hidden area 125 may or may not be password protected.

Like the hidden area 125, the system area 126 is accessible to the circuitry 130 (e.g., for firmware operations) but is not directly accessible by a host device via its file system. In one presently preferred embodiment, the portable memory device 100 operates in accordance with TrustedFlash™ security technology from SanDisk Corporation, and the system area 126 is the internal area used by the TrustedFlash™ system. In this embodiment, the system area 126 includes a register 127 that contains a password needed to access the private area 124, an offset register 128 that includes address offset parameters for accessing the private area 124 and the hidden area 125 (as described below), and a register 129 that includes an encrypted key, in the event that the circuitry 130 of the portable memory device 100 is operative to perform encryption/decryption operations. It should be noted that instead of storing the password in the system area 126, the password can be stored in some other area of the storage medium 120 or in another location in the portable memory device 100. Also, while the password can be stored in hashed form for additional security, the password can instead be stored in a clear, un-hashed form.

Figure 2:
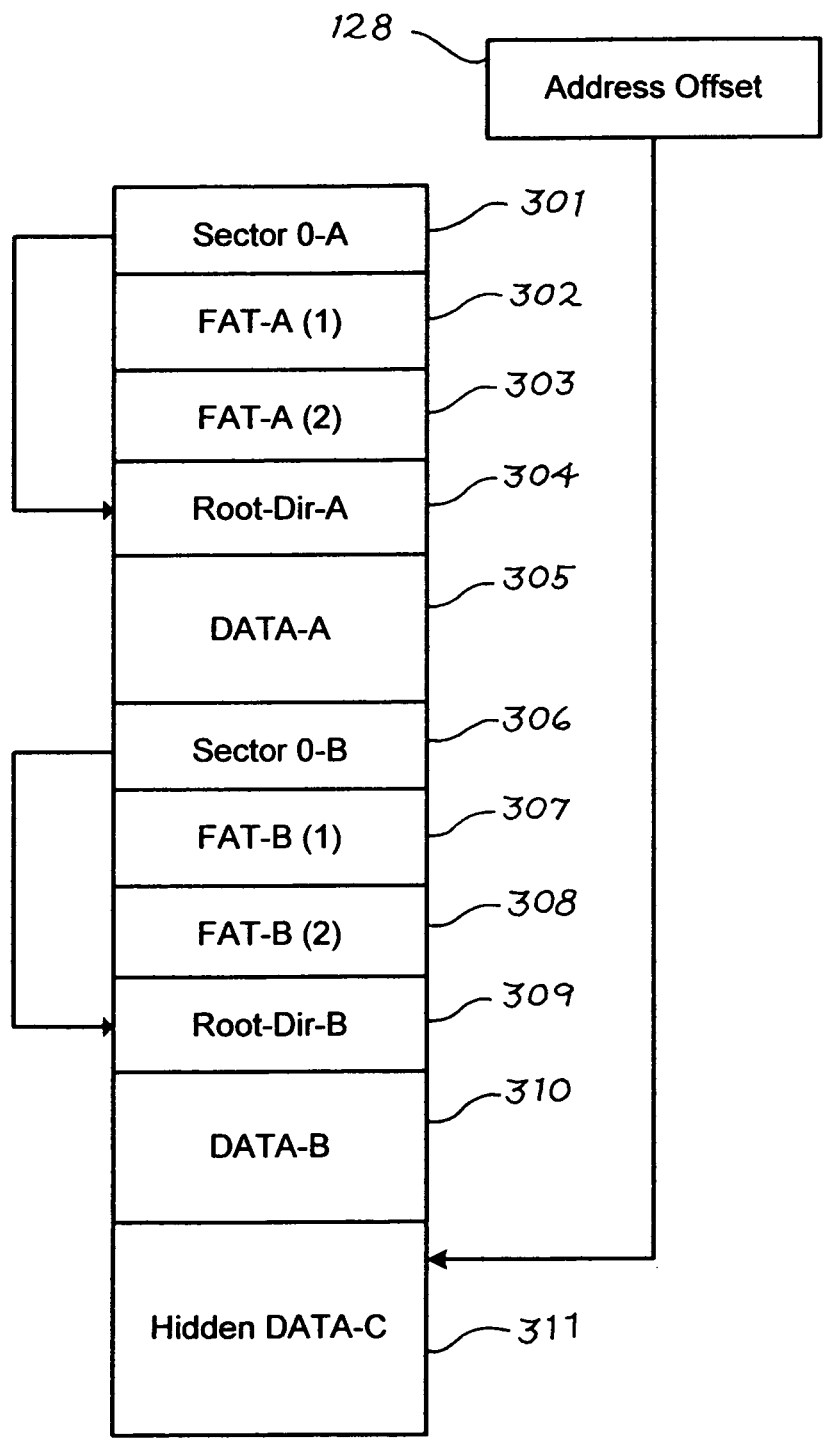
FIG. 2 is a diagram illustrating a file system of an embodiment.

In one embodiment, the public area 122, private area 124, and hidden area 125 are different partitions in the storage medium 120. FIG. 2 is an illustration of a file system of an embodiment that will be used to illustrate these partitions. In general, "sector 0" is a predefined address in the storage medium 120 that provides the size and location of other storage areas of the storage medium 120. FAT(1) and FAT(2) are two redundant copies of a file allocation table that is dynamically managed to transform between logical addresses used by an application program in a host device 200 and physical addresses where the data is actually stored in storage medium 120. The root directory contains information on files and folders at the base level of the employed hierarchical file system. Data storage areas contains user data in files organized under the FAT. Blocks 301-305 relate to the public area 122, blocks 306-310 relate to the private area 124, and block 311 relates to the hidden area 125. When a host device approaches the portable memory device 100 to access its file system, it seeks the standard sector-0 address. However, the circuitry 130 looks at the value of address offset register 128, and according to the value, refers the host device 200 to either the public area 122 or the private area 124. Further, the value of the address offset register can direct the circuitry 130 to the hidden block 311. By default, the circuitry 130 preferably uses an address offset of zero; thus, the host device 200 sees the public area 122 via "sector 0-A" 301. When the switch is made from the public area 122 to the private area 124, the address offset pointing to "sector 0-B" (306) will be used instead of an offset of zero. More information about this "swapping" can be found in "Apparatus and Method for Securing Data on a Portable Storage Device," U.S. Patent Application Publication No. US 2004/0103288, filed Nov. 27, 2002, which is hereby incorporated by reference.

As mentioned above, in this embodiment, the circuitry 130 of the portable memory device 100 provides an access control system in which the private area 124 is accessible by the host device 200 only upon the receipt of an appropriate password. As used herein, a "password" can take any suitable form. For example, a password can be a string of alphanumeric characters or a set of biometric parameters read from the user via an appropriate device, such as a fingerprint reader. In one embodiment, a password is generated by a user, such as when the user creates his own password or when a password is generated by a set of biometric parameters unique to the user. However, in other embodiments, the password can be generated by another entity. Preferably, the password is only known and accessible to the user.

Although any type of password can be used, in this embodiment, the password takes the form of a password needed to "unlock" a host device 200 that is locked to user access to the host device 200. A host device is "locked" when a user cannot access at least some of its functionality. For example, when a mobile phone is locked, a user is typically unable to place a call or access data stored in the phone. However, a locked phone is still capable of accepting an unlock password from the user to unlock the phone and may be able to perform other functions, such as ringing or vibrating in response to an incoming call or message. To unlock the phone, the user enters a password, which is usually generated by the user but can also be a default password for the phone (e.g., the last four digits of the phone number associated with the phone). In this embodiment, instead of merely using the unlock password to unlock the host device 200, the unlock password is also sent to the circuitry 130 of the portable memory device 130, which compares the received password with the password stored in the portable memory device 100. (As noted above, for additional security, the password can be hashed, in which case, the received password would be hashed and compared to the hashed password. The phrase "comparing the received password with the password stored in the portable memory device" is intended to cover either situation.) If the password received from the host device 200 matches the password stored in the portable memory device 100, the circuitry 130 allows the host device 200 to access the private area 124. ("Match" can be exact match or match within some degree of error.) If the password received from the host device 200 does not match the password stored in the portable memory device 100, the host device 200 will not be provided access to the private area 124. A limit can be placed on the number of attempts to enter the correct password.

By automatically sending the host device unlock password to the portable memory device 100 as part of the host-device-unlock operation, a user will only be required to enter the password once (when unlocking the host device 200) instead of twice (when unlocking the host device 200 and when attempting to access the private area 124). This provides a seamless log in process to the private area 124 and allows a user to enjoy the security benefits offered by the private area 124 without requiring the user to perform numerous log in processes. (Alternatively, the user can enter the unlock password twice: once to unlock the host device 200 and once to gain access to the private area 124.)

Figure 3:
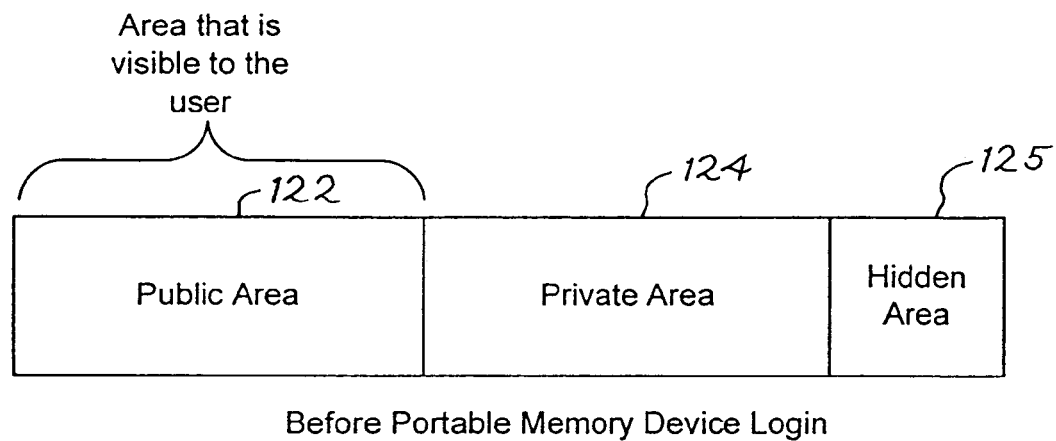
FIG. 3 is a diagram illustrating use of a storage medium before a host device logs in to a portable memory device of an embodiment.
Figure 4:
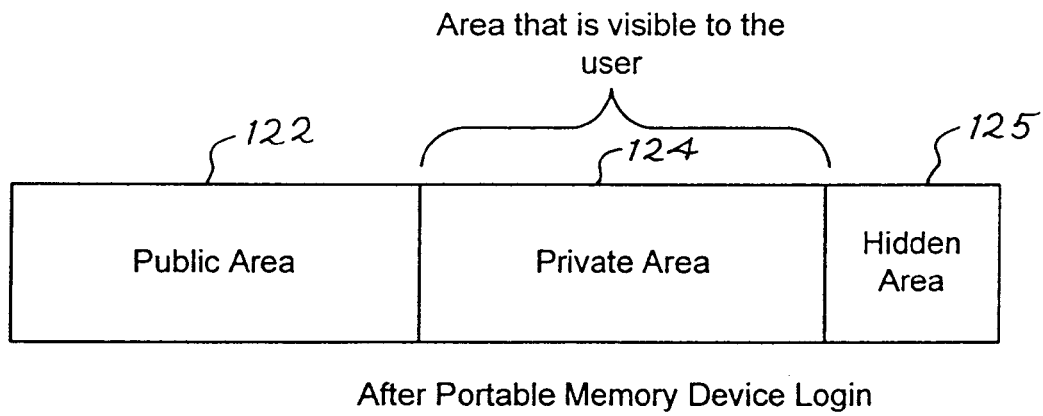
FIG. 4 is a diagram illustrating use of a storage medium after a host device logs in to a portable memory device of an embodiment.

In this embodiment, at any given time, the host device 200 will either see the public area 122 or the private area 124 but not both. This is illustrated in FIGS. 3 and 4. (As shown in these figures, both before and after log in, the hidden area 125 remains invisible to the user.) Accordingly, any data stored to the portable memory device 100 after the user unlocks the host device 200 will be stored in the secured private area 124. As the user would not know there are two separate storage areas in the portable memory device 100, the user would not need to worry about taking any special steps to protect his data (e.g., emails, attachments, documents, pictures, etc.) by manually selecting the private area 124. As any data stored after log in will be automatically stored in the private area 124, all stored data is protected from unauthorized access if the portable memory device 100 is lost or stolen. (In an alternate embodiment, both the public area 122 and the private area 124 are visible to the user after log in, and a manual or automatic selection mechanism is provided to determine which area 122, 124 to access.)

It is recognized that, by its very nature, the portable memory device 100 can be used with a large variety of host devices, some of which may not be compatible with the access control system provided by the portable memory device 100. For example, a given host device may not know to lock itself when placed in communication with the portable memory device 100 or may not know to send the unlock password to the portable memory device 100. Accordingly, in one embodiment, the public area 122 stores computer-readable program code (e.g., a software application) that, when executed on a host device, provides the host device with the needed functionality to be compatible with the access control system provided by the portable memory device 100. (In one embodiment, the software application takes the form of a plug-in to the operating system of the host device 200.) Because the public area 122 is accessible without a password, a host device can access the computer-readable program code stored in the public area 122 without any special knowledge of the access control system provided by the portable memory device 100. Preferably, the public area 122 stores computer-readable program code for a wide variety of host devices likely to be used by users. By providing code for different operating systems and different host devices (e.g., different mobile phones or different types of personal computers (PCs or Macs)), data stored on the portable memory device 100 will be accessible from a wide variety of platforms. Further, this allows the user to have a very similar and familiar experience on all support host devices.

To make the built-in software distribution process as simple as possible for the user, the computer-readable program code can be configured for "autorun" functionality. That is, when the user plugs the portable memory device 100 into a host device, the host device can automatically execute an installation application to install the computer-readable program code on the host device. This may be preferred if the host device operates using the Windows Mobile® operating system. Other installation methods can be used. For example, if autorun is not used, a user can browse the content of the public area 122 of the portable memory device 100 using a browser on the host device and then manually select the installation file for execution. As another alternative, the user can synch the host device (e.g., a mobile phone) to another host device (e.g., a PC), and install the application on the mobile phone using the PC. As yet another alternative, instead of storing the application itself, the portable memory device 100 can store the network address (e.g., a universal resource locator (URL)) of a network location storing the needed application, and the host device can retrieve the needed application from the network location using the specified address.

It should be noted that, in addition to the computer-readable program code needed to make the host device 200 compatible with the access control system of the portable memory device 100, the public area 122 can store other applications for distribution to the host device 200. For example, the public area 122 can store an application that changes the routing settings of the host device so that certain or all user data (such as, for example, pictures and other email attachments, downloaded files, and browsed data) will be automatically routed to the private area 124 of the portable memory device instead of the internal memory of the host device 200. As another example, the public area 122 can store an application to connect the host device 200 to a network server that pushes security and other policies to the host device 200 to provide enhanced security for the user. For example, the network server can require a more secure unlock password (e.g., one of a longer length or more complex format) than is otherwise required by the host device. It should be noted that the applications stored in the public area 122 do not necessarily have to relate to the access control mechanism. For example, the public area 122 can store a one-time password (OTP) generation application, so the host device 200 can generate a one-time password needed to log in to a secure website using another host device, such as a PC.

Figure 5:
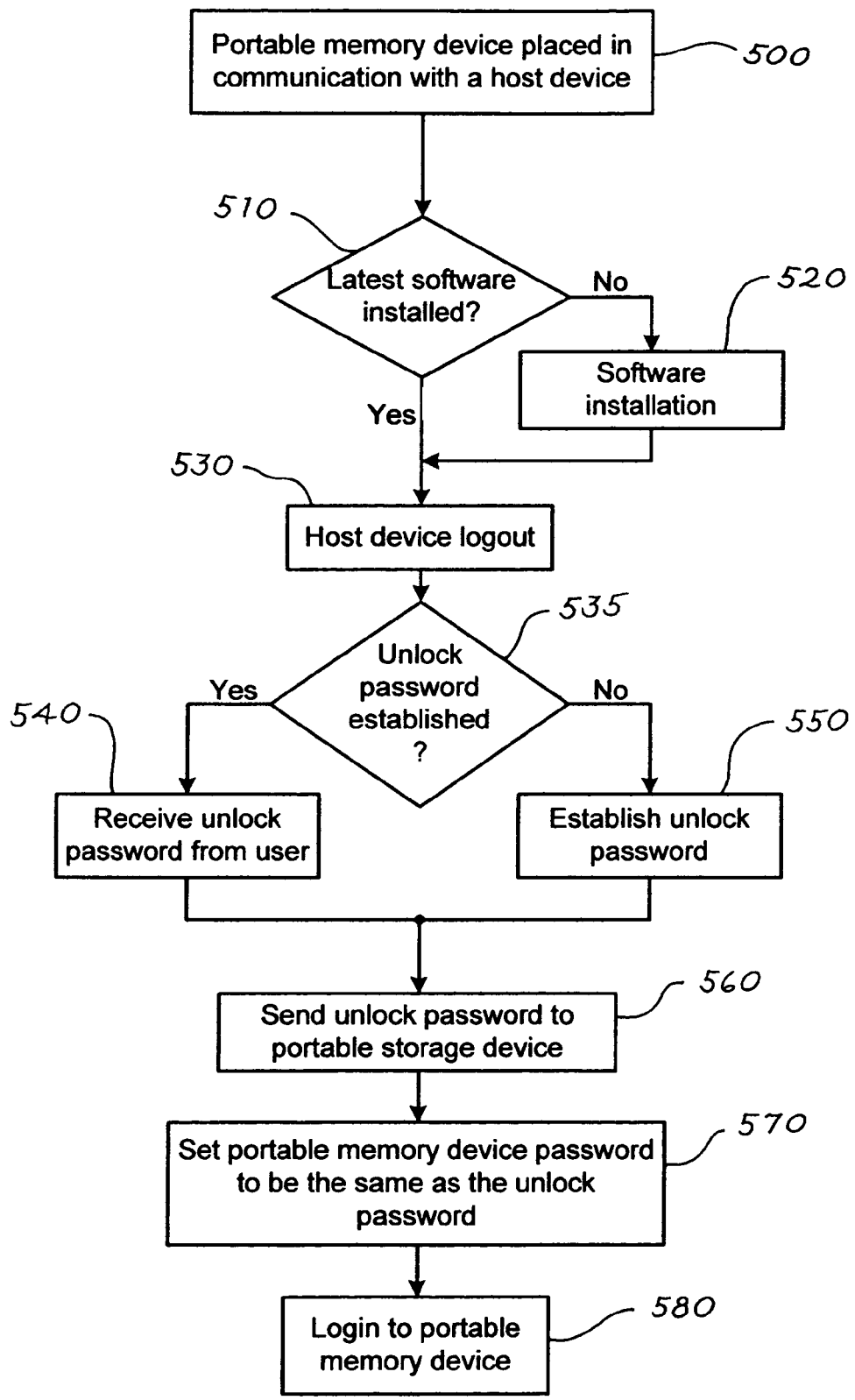
FIG. 5 is a flow chart for setting an access control password in a portable memory device of an embodiment.

Returning to the drawings, FIG. 5 is a flow chart illustrating the operations for setting the access control password in the portable memory device 100. These operations can occur, for example, the first time the portable memory device 100 is used or after it is reset. As shown in FIG. 5, after the portable memory device is placed in communication with the host device 200 (act 500), a determination is made regarding whether the latest software application is installed on the host device 200 (act 510). For example, a comparison can be made between the software version number of the software application installed on the host device 200 and the software version number of the software application stored in the public area 122 in the portable memory device 100. If the latest software application has not been installed, a software installation process, such as one of the processes discussed above, is performed (act 520). The host device 200 then logs out (act 530).

Figure 6:
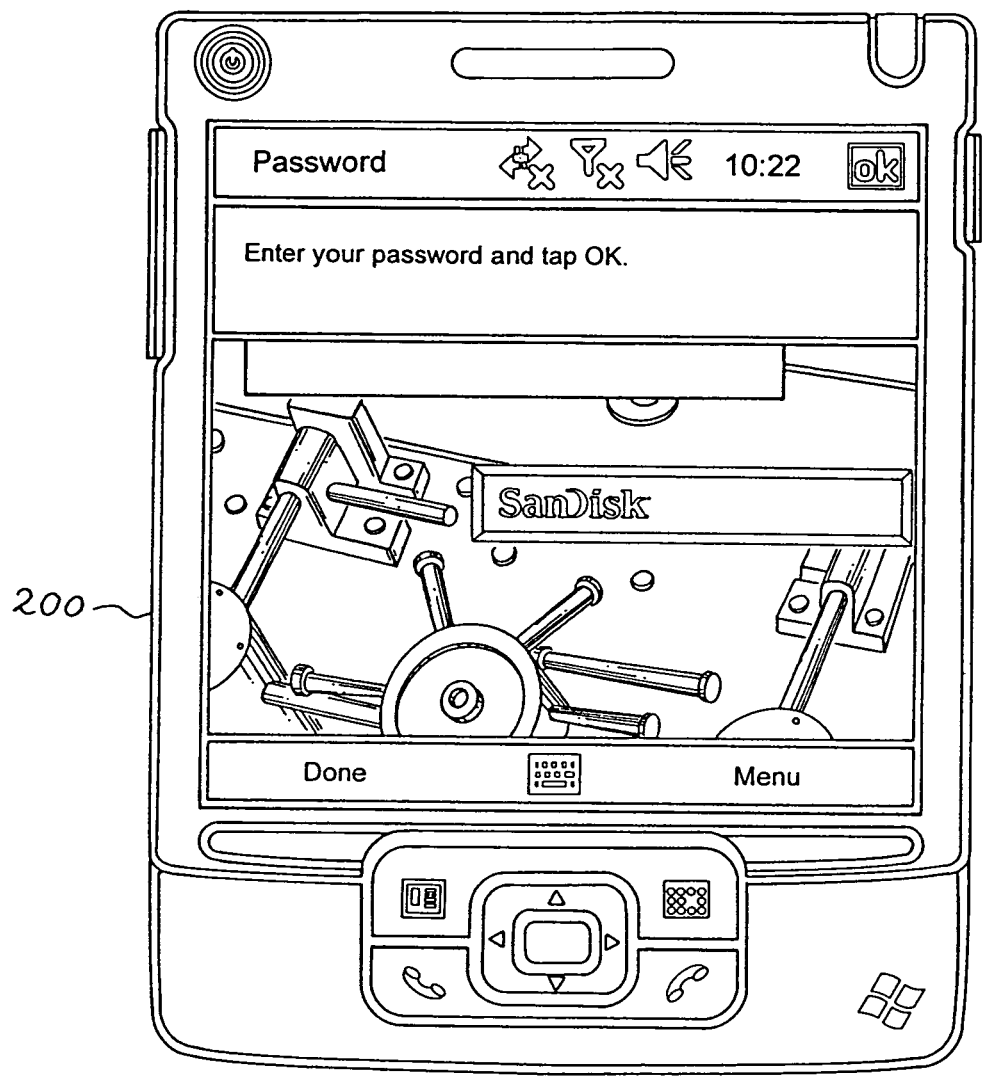
FIG. 6 is an illustration of a display that requests a password to unlock a host device of an embodiment.
Figure 7A:
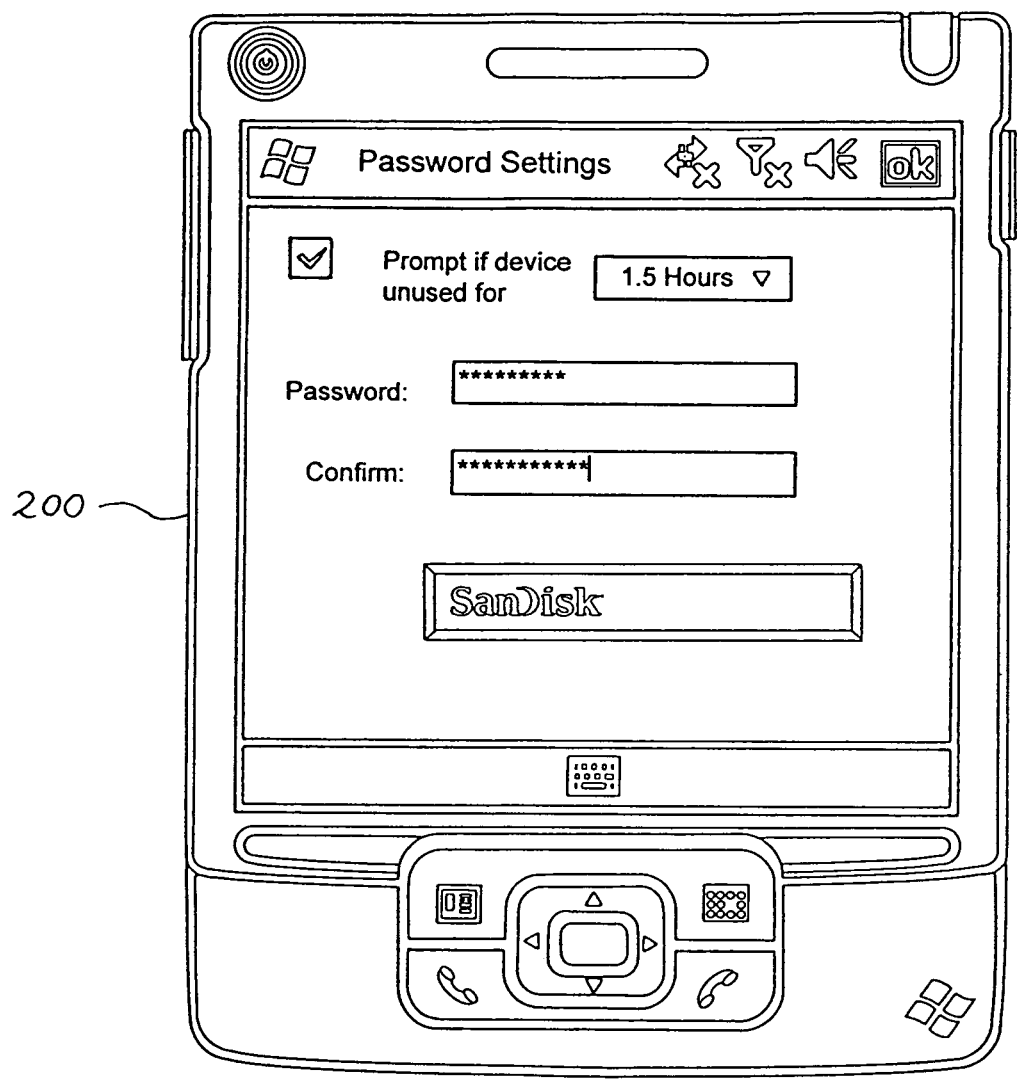
FIG. 7A is an illustration of a display that establishes a password to unlock a host device of an embodiment.

Next, a determination is made regarding whether an unlock password has been established for the host device 200 (act 535). If an unlock password has been established, the software on the host device 200 causes the host device 200 to lock and request the unlock password from the user. This forces the user to enter the unlock password, and the software on the host device 200 receives the unlock password from the user (act 540). FIG. 6 is an illustration of a display for requesting a password to unlock the host device 200 (of course, other displays can be used). If an unlock password has not been established, the software on the host device 200 forces the user to establish an unlock password (act 550), as it is needed for the access control mechanism provided by the portable memory device 100. FIG. 7A is an illustration of a display for establishing a password to unlock the host device 200 (of course, other displays can be used). As shown in FIG. 7A, the display can not only request the unlock password, but also request that the user enter the unlock password again for confirmation and provide the user with the option of prompting the user for the unlock password if the host device 200 is unused for a given period of time.

After the user enters or establishes the unlock password, the unlock password is sent to the portable memory device 100 (act 560), and the circuitry 130 sets the portable memory device password to be the same as the unlock password (act 570). It should be noted that, in some embodiments, the portable memory device 100 can be manufactured with a default password, which is stored in the portable memory device 100. In such a situation, the circuitry 130 can be operative to replace the default password with the password received from the host device 200 when the user password is established. In any event, after the unlock password is set in the portable memory device 100, the host device 200 can login to the portable memory device 100 (act 580).

When a user removes and reconnects the portable memory device 100 to the host device 200 (or when the user locks or power cycles the host device 200 or when the host device 200 power cycles the portable memory device 100, for example), the software can cause the host device 200 to lock, request the password to unlock the host device 200, and send the received password to the portable memory device 100. The circuitry 130 in the portable memory device 100 will then compare that password to the password stored in the portable memory device 100, and if the passwords match, the circuitry 130 will allow the host device 200 to access the private area 124. However, if the portable memory device 100 is used with a second host device, it is possible that the unlock password for the second host device will be different from the unlock password of the host device 200 that was used to establish the password in the portable memory device 100. In that situation, the password entered by the user to unlock the second host device will not match the password stored in the portable memory device 100, and the user will not be allowed access to the private area 124.

Figure 7B:
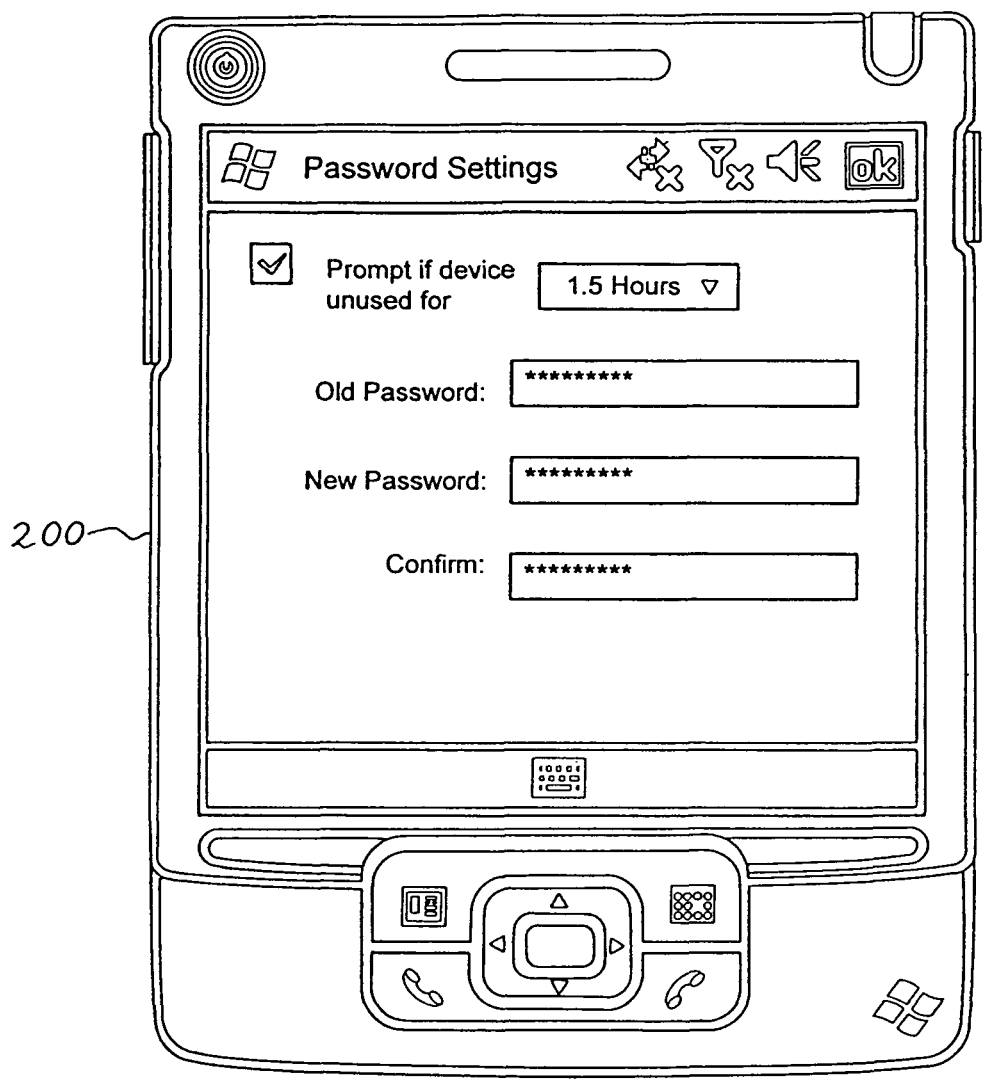
FIG. 7B is an illustration of a display that changes a password of an embodiment.
Figure 8:
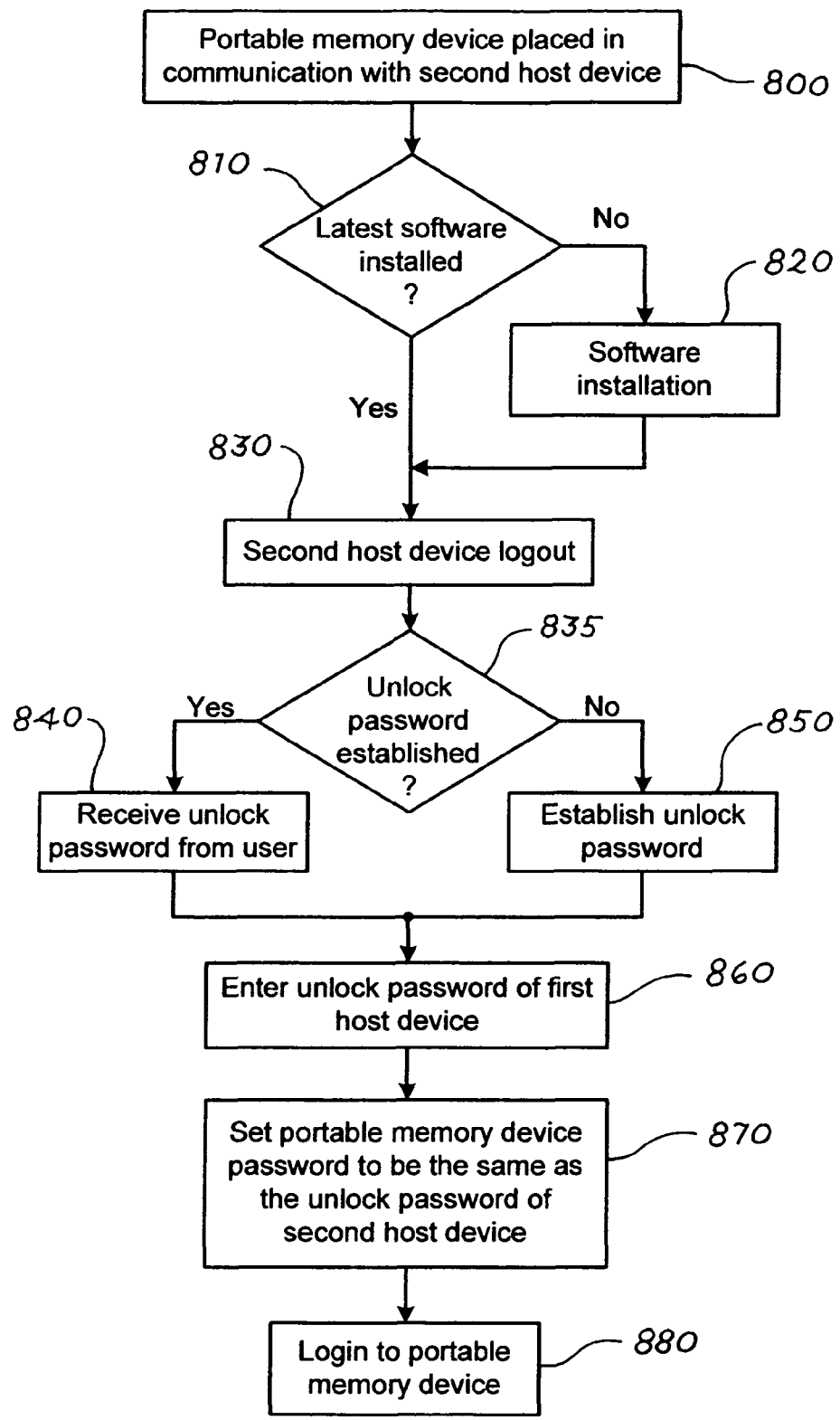
FIG. 8 is a flow chart illustrating operations that take place when a portable memory device of an embodiment is used with a different host device.

The software stored in the public area 122 of the portable memory device 100 can be configured to enable any given host device to address this situation. This process will be described in conjunction with the flow chart shown in FIG. 8. After the portable memory device 100 is placed in communication with a host device, the software check and unlock password process acts (acts 810-850) proceed as described above in conjunction with FIG. 5. However, the software can have the additional ability of determining whether the password stored in the portable memory device 100 was established by the host device currently in communication with the portable memory device 100 or by a different host device. In one embodiment, the circuitry 130 in the portable memory device 100 stores a unique ID (such as a serial number) of the host device (the "first host device") whose unlock password is stored in the system area 126. The software running on a host device in communication with the portable memory device 100 can compare the stored unique ID with the unique ID of the host device. If the unique IDs match, the access control process described above proceeds. However, if the unique IDs do not match, the software will prompt the user to also enter the unlock password of the first host device (act 860). If the unlock password of the first host device matches the password stored in the portable memory device 100, the circuitry 130 replaces the password stored in the portable memory device 100 with the password to unlock the second host device (act 870). The second host device 200 then logs in to the portable memory device 100 and has access to the private area 124 (act 880). (A similar process can occur when a user changes the unlock password on a host device, and FIG. 7B is an illustration of a suitable display for that purpose and for when a user places the portable memory device 100 in a different host device (e.g., a different phone).)

Figure 9:
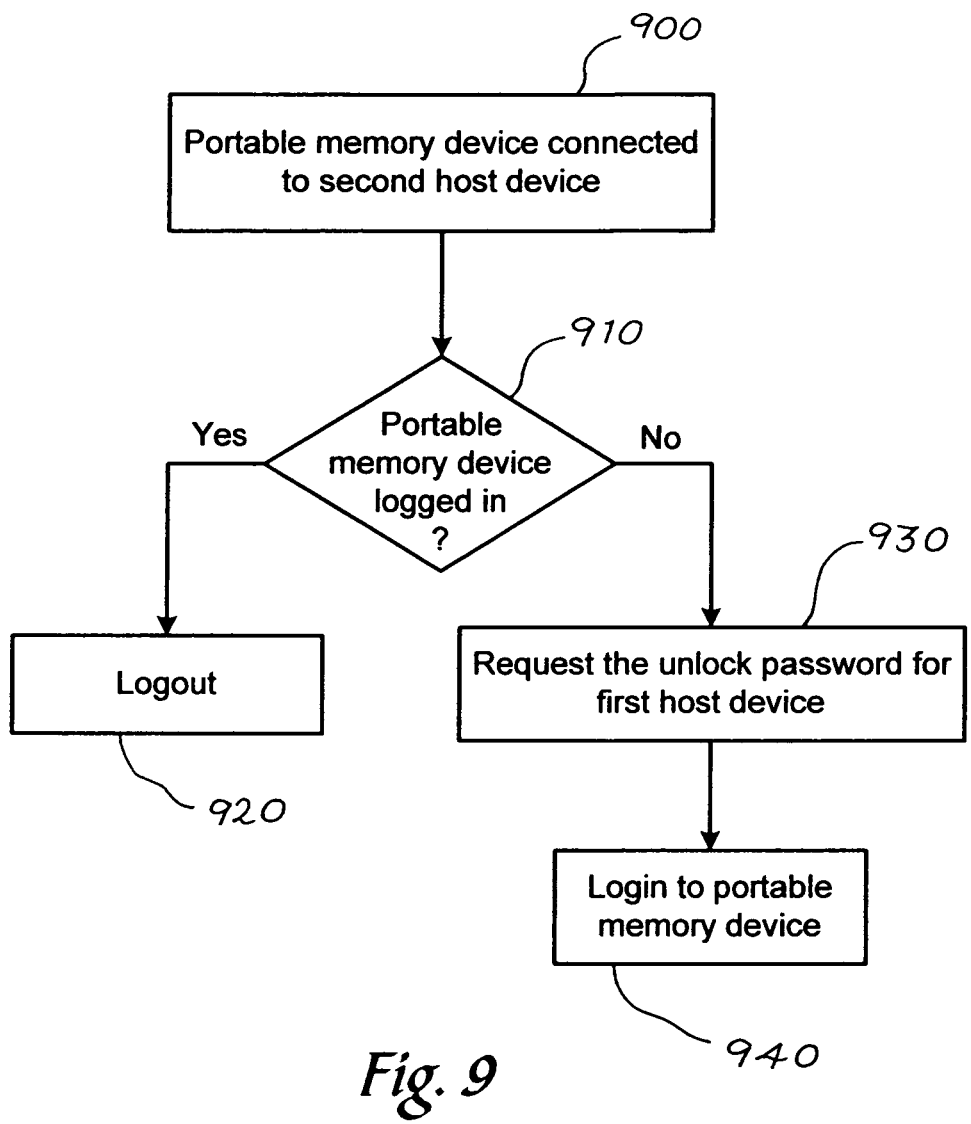
FIG. 9 is a flow chart illustrating operations of a host device, such as a personal computer, and a portable memory device of an embodiment.
Figure 10:
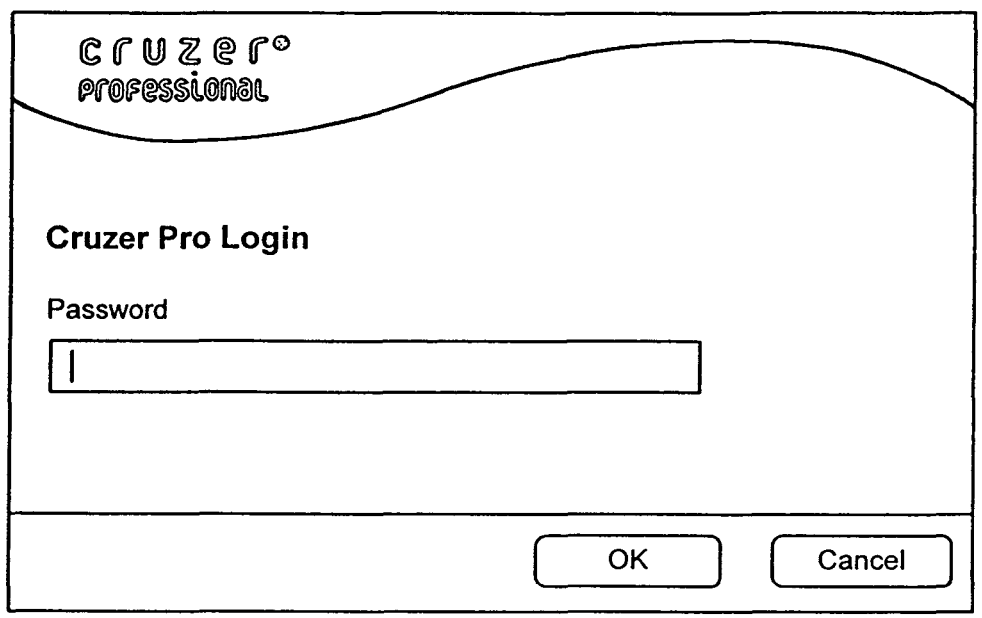
FIG. 10 is an illustration of a display presenting a password prompt of an embodiment.
Figure 11:
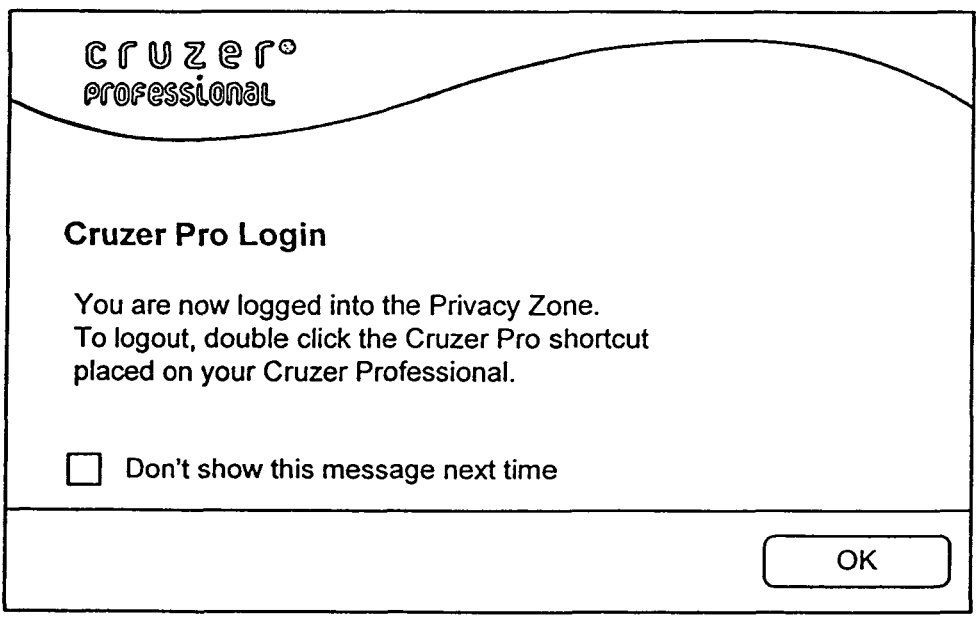
FIG. 11 is an illustration of a display of a successful login message of an embodiment.

In some of the above embodiments, the software from the public area 122 of the portable memory device 100 is automatically launched and installed on a host device, so the software installation process does not have to occur every time the portable memory device 100 is placed in communication with the host device. This may be especially preferred, for example, if the host device is a mobile phone and the portable memory device 100 is a memory card. However, for some host devices (such as personal computers), it may be preferred to execute the software from the portable memory device 100 every time the host device accesses the portable memory device 100 instead of keeping the software resident in the host device. The flow chart in FIG. 9 illustrates this situation. As shown in FIG. 9, after the portable memory device 100 is placed in communication with such a host device (here, called the "second host device") (act 900), a determination is made as to whether the portable memory device 100 is logged in (act 910). If the card is logged in and a logout request is presented, a logout procedure occurs (act 920). If, however, the portable memory device 100 is not logged in, the user uses the second host device to browse the public area 122 of the portable memory device 100 and run the software application stored therein. The software application will then ask the user for the unlock password of the first host device (i.e., the host device that established the password in the portable memory device 100) (act 930). FIG. 10 is an illustration of a display of the second host device presenting a password prompt. If the passwords match, the second host device is logged into the portable memory device 100 (act 940) and can access the private area 124. After login, the user can be presented with a display, such as the one shown in FIG. 11, acknowledging successful login. (In one embodiment, displays such as those in FIGS. 10 and 11 are used when the host device is a personal computer but not when the host device is a mobile phone (although such displays can also be used on a mobile phone).)

Many alternatives can be used with these embodiments. For example, to provide additional security for data stored in the private area 124 of the portable memory device 100, the circuitry 130 can be further operative to perform encryption on data to be stored in the private area 124 and decryption of encrypted data to be read from the private area 124. Any suitable on-the-fly encryption/decryption mechanism can be used. For example, the circuitry 130 can generate a random "clear" key and encrypt it under the host device unlock password (or some other user-generated password) using a symmetric encryption key method such as Data Encryption Standard (DES) or triple-DES or a simpler scrambling method, depending on the desired security level. In one embodiment, the encrypted version of the key is stored in register 129 in the system area 126 of the storage medium 120 of the portable memory device 100 (see FIG. 1). In operation, the encrypted key is retrieved from register 129 and is decrypted using the password. If a write process is called, the circuitry 130 receives a block of clear data from the host device 200 and encrypts the received block. Similarly, if a read procedure is called, the circuitry 130 reads a block of encrypted data from the private area 124 and decrypts it using the key.

"Apparatus and Method for Securing Data on a Portable Storage Device," U.S. Patent Application Publication No. US 2004/0103288, filed Nov. 27, 2002, describes additional embodiments that can be used with the embodiments described herein and is hereby incorporated by reference.

Some of the following claims may state that a component is operative to perform a certain function or is configured for a certain task. It should be noted that these are not restrictive limitations. It should also be noted that the acts recited in the claims can be performed in any order—not necessarily in the order in which they are recited. Also, it is intended that the foregoing detailed description be understood as an illustration of selected forms that the invention can take and not as a definition of the invention. It is only the following claims, including all equivalents, that are intended to define the scope of this invention. Finally, it should be noted that any aspect of any of the preferred embodiments described herein can be used alone or in combination with one another.

What is claimed is:

1. A portable memory device comprising:
   a storage medium comprising a private memory area; and
   circuitry in communication with the storage medium, wherein the circuitry is operative to:
      receive, from a host device in communication with the portable memory device, a password entered by a user to unlock the host device;
      compare the password received from the host device with a password stored in the portable memory device; and
      if the password received from the host device matches the password stored in the portable memory device, allow the host device to access the private memory area, wherein the password to unlock the host device also provides access to the private memory area.

2. The portable memory device of claim 1, wherein the storage medium further comprises a public area storing computer-readable program code that, when executed on the host device:
   locks user access to the host device after the portable memory device is placed in communication with the host device;
   requests the password to unlock the host device; and
   sends the password to the portable memory device.

3. The portable memory device of claim 1, wherein the storage medium further comprises an area not accessible to the host device, and wherein the password stored in the portable memory device is stored in that area.

4. The portable memory device of claim 1, wherein the circuitry is further operative to perform encryption on data to be stored in the private memory area and decryption of encrypted data to be read from the private memory area.

5. The portable memory device of claim 1, wherein the password to unlock the host device is generated by a user of the host device.

6. The portable memory device of claim 1, wherein the storage medium further comprises a public area, and wherein the circuitry is further operative to allow access to the public area without requiring a password.

7. The portable memory device of claim 1, wherein the portable memory device comprises a memory card.

8. The portable memory device of claim 1, wherein the host device comprises a mobile phone.

9. A portable memory device comprising:
   a storage medium comprising:
      a private memory area; and
      a public area storing computer-readable program code that, when executed on a host device in communication with the portable memory device:
         locks user access to the host device after the portable memory device is placed in communication with the host device;
         requests a password from a user to unlock the host device; and sends the password to the portable memory device; and circuitry in communication with the storage medium, wherein the circuitry is operative to allow the host device to access the private memory area if the password matches a password stored in the portable memory device, wherein the password to unlock the host device also provides access to the private memory area.

10. The portable memory device of claim 9, wherein the portable memory device is manufactured with a default password, and wherein the circuitry is further operative to replace the default password with the password received from the host device.

11. The portable memory device of claim 9, wherein the public area stores additional computer-readable program code that, when executed on the host device:
   determines if a password has been established to unlock the host device; and
   if a password has not been established to unlock the host device, establishes a password to unlock the host device.

12. The portable memory device of claim 9, wherein the public area stores additional computer-readable program code that, when executed on the host device:
   determines whether the password stored in the portable memory device was established by the host device or by a different host device;
   requests a password from the user to unlock the different host device if the password stored in the portable memory device was established by the different host device; and
   sends the password to unlock the different host device to the portable memory device;
   wherein the circuitry is further operative to allow the host device to access the private memory area if the password to unlock the different host device matches the password stored in the portable memory device.

13. The portable memory device of claim 12, wherein the circuitry is further operative to replace the password stored in the portable memory device with the password to unlock the host device.

14. The portable memory device of claim 12, wherein the portable memory device stores a unique ID of a host device that established the password stored in the portable memory device, and wherein the additional computer-readable program code determines whether the password stored in the portable memory device was established by the host device or by the different host device by comparing the stored unique ID with the unique ID of the host device.

15. The portable memory device of claim 9, wherein the public area stores additional computer-readable program code that, when executed on a different host device, requests the password to unlock the host device.

16. The portable memory device of claim 15, wherein the different host device comprises a personal computer.

17. The portable memory device of claim 9, wherein the storage medium further comprises an area not accessible to the host device, and wherein the password stored in the portable memory device is stored in that area.

18. The portable memory device of claim 9, wherein the circuitry is further operative to perform encryption on data to be stored in the private memory area and decryption of encrypted data to be read from the private memory area.

19. The portable memory device of claim 9, wherein the password to unlock the host device is generated by a user of the host device.

20. The portable memory device of claim 9, wherein the circuitry is further operative to allow access to the public area without requiring a password.

21. The portable memory device of claim 9, wherein the portable memory device comprises a memory card.

22. The portable memory device of claim 9, wherein the host device comprises a mobile phone.

23. A method for providing access control for a portable memory device comprising a storage medium comprising a private memory area, the method comprising:
   receiving, from a host device in communication with a portable memory device, a password entered by a user to unlock the host device;
   comparing the password received from the host device with a password stored in the portable memory device; and
   if the password received from the host device matches the password stored in the portable memory device, allowing the host device to access a private memory area in a storage medium in the memory device, wherein the password to unlock the host device also provides access to the private memory area.

24. The method of claim 23, wherein the storage medium further comprises a public area storing computer-readable program code that, when executed on the host device:
   locks user access to the host device after the portable memory device is placed in communication with the host device;
   requests the password to unlock the host device; and
   sends the password to the portable memory device.

25. The method of claim 23, wherein the storage medium further comprises an area not accessible to the host device, and wherein the password stored in the portable memory device is stored in that area.

26. The method of claim 23 further comprising performing at least one of the following;
   encrypting on data to be stored in the private memory area; and
   decrypting encrypted data to be read from the private memory area.

27. The method of claim 23, wherein the password to unlock the host device is generated by a user of the host device.

28. The method of claim 23, wherein the storage medium further comprises a public area, and wherein the method further comprises allowing access to the public area without requiring a password.

29. The method of claim 23, wherein the portable memory device comprises a memory card.

30. The method of claim 23, wherein the host device comprises a mobile phone.

31. A method for providing access control for a portable memory device comprising a storage medium comprising a private memory area, the method comprising:
   providing a host device in communication with a portable memory device with computer-readable program code stored in a public area of a storage medium of the portable memory device, wherein the computer-readable program code, when executed on the host device, locks user access to the host device after the portable memory device is placed in communication with the host device and requests a password from a user to unlock the host device;
   receiving the password from the host device; and
   allowing the host device to access a private memory area of the storage medium of the portable memory device if the password matches a password stored in the portable memory device, wherein the password to unlock the host device also provides access to the private memory area.

32. The method of claim 31, wherein the portable memory device is manufactured with a default password, and wherein the method further comprises replacing the default password with the password received from the host device.

33. The method of claim 31 further comprising providing the host device with additional computer-readable program code that, when executed on the host device:
- determines if a password has been established to unlock the host device; and
- if a password has not been established to unlock the host device, establishes a password to unlock the host device.

34. The method of claim 31 further comprising providing the host device with additional computer-readable program code that, when executed on the host device:
- determines whether the password stored in the portable memory device was established by the host device or by a different host device;
- requests a password from the user to unlock the different host device if the password stored in the portable memory device was established by the different host device; and
- sends the password to unlock the different host device to the portable memory device.

35. The method of claim 34 further comprising replacing the password stored in the portable memory device with the password to unlock the host device.

36. The method of claim 34, wherein the portable memory device stores a unique ID of a host device that established the password stored in the portable memory device, and wherein the additional computer-readable program code determines whether the password stored in the portable memory device was established by the host device or by the different host device by comparing the stored unique ID with the unique ID of the host device.

37. The method of claim 31 further comprising providing a different host device with computer-readable program code that, when executed on the different host device, requests the password to unlock the host device.

38. The method of claim 37, wherein the different host device comprises a personal computer.

39. The method of claim 31, wherein the storage medium further comprises an area not accessible to the host device, and wherein the password stored in the portable memory device is stored in that area.

40. The method of claim 31 further comprising performing at least one of the following;
- encrypting on data to be stored in the private memory area; and
- decrypting encrypted data to be read from the private memory area.

41. The method of claim 31, wherein the password to unlock the host device is generated by a user of the host device.

42. The method of claim 31 further comprising allowing access to the public area without requiring a password.

43. The method of claim 31, wherein the portable memory device comprises a memory card.

44. The method of claim 31, wherein the host device comprises a mobile phone.

* * * * *

UNITED STATES PATENT AND TRADEMARK OFFICE
CERTIFICATE OF CORRECTION

| | | |
|---|---|---|
| PATENT NO. | : 8,695,087 B2 | Page 1 of 1 |
| APPLICATION NO. | : 12/082083 | |
| DATED | : April 8, 2014 | |
| INVENTOR(S) | : Priel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1553 days.

Signed and Sealed this
Twenty-first Day of July, 2015

Michelle K. Lee
*Director of the United States Patent and Trademark Office*